Oct. 24, 1939.  J. P. BURKE  2,177,093
COMPOSITE STRUCTURE AND METHOD OF FORMING THE SAME
Filed April 12, 1937
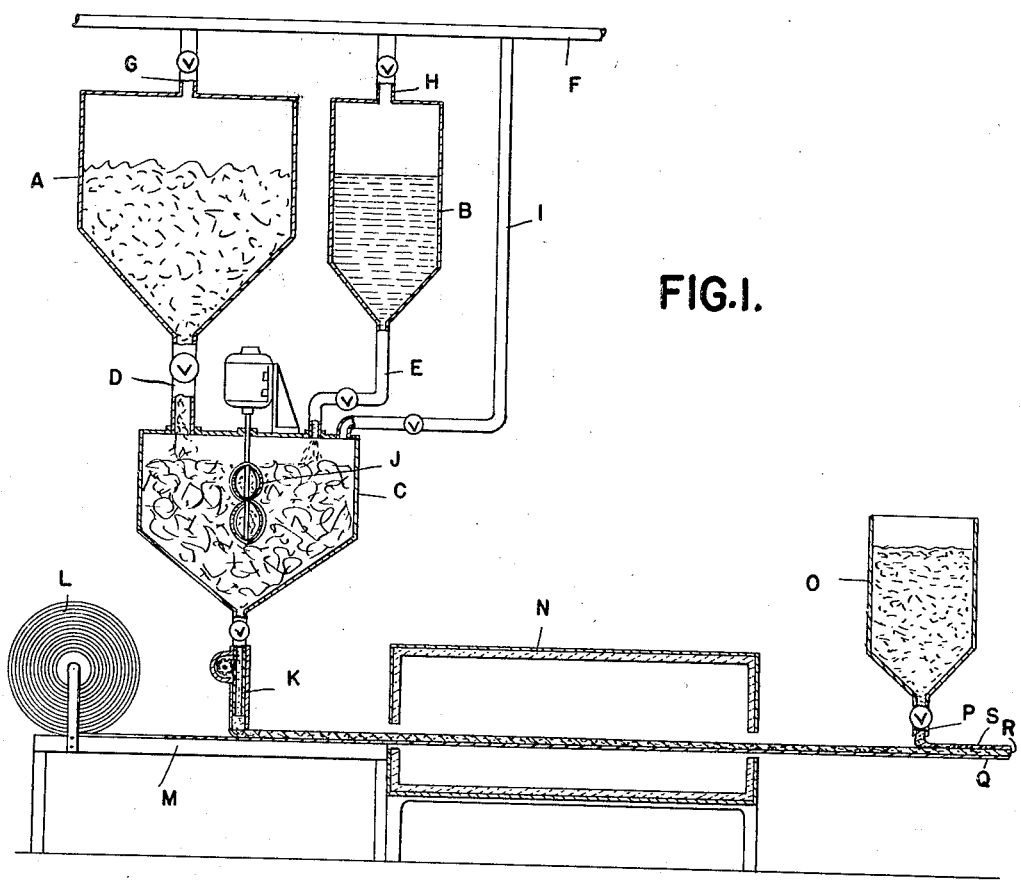
FIG.1.
FIG.2.
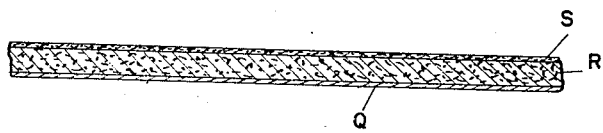
INVENTOR
JAMES P. BURKE
BY
ATTORNEYS Patented Oct. 24, 1939

2,177,093

UNITED STATES PATENT OFFICE 2,177,093

COMPOSITE STRUCTURE AND METHOD OF FORMING THE SAME

James P. Burke, Knoxville, Tenn., assignor, by mesne assignments, to Vermiculite Corporation of America, Detroit, Mich., a corporation of Michigan Application April 12, 1937, Serial No. 136,458

1 Claim. (Cl. 91—68)

The invention relates to composite materials of that type including vermiculite or equivalent siliceous material and a binder. It is the object of the invention to obtain a structure formed of such material, the body portion of which is of an exceedingly porous nature so as to form effective thermal and sound insulation, while the exposed surface is of a weatherproof character. Such article is adapted for the forming of shingles or other roof coverings, as well as for many other uses. The invention, therefore, consists in the structure and method of forming the same as hereinafter set forth.

In the drawing:

Figure 1 is a diagram illustrating the method of forming my improved structure;

Figure 2 is an enlarged cross section through the structure.

Exfoliated vermiculite is a material formed of irregular flakes which in mass have a relatively high percentage of voids. If this material is integrated by the use of a limited quantity of binder it will still be of a porous nature, and if during the commingling process air is introduced into the mixture the resulting product has a still greater percentage of voids. Such product is well adapted for thermal and sound insulation but on account of its porous nature it is not suitable for exposure to the weather. I have, therefore, formed a structure the body portion of which is the integrated porous vermiculite, while the surface is provided with a layer of weatherproofing material which renders it impervious to water. This forms an excellent roof covering and the structure is also adapted for other uses.

As specifically shown, A and B are containers respectively for the exfoliated vermiculite and a binder, preferably a varnish. C is a commingling chamber to which the containers A and B are connected by conduits D and E. F is a conduit for air under pressure having branch conduits G and H to the top of the containers A and B, and a conduit I leading to the top of the commingling chamber C. Within the chamber C is an agitator J which not only commingles the vermiculite and binder, but also introduces into the mixture a quantity of air. The mixture is then ejected through a nozzle K and deposited on a base of any suitable material which is advanced beneath said nozzle. Figure 1 shows an apparatus for applying this mixture to a fabric base, L being a roll of burlap or other suitable fabric which is advanced over a table M beneath the nozzle K. The porous material deposited on this fabric is then advanced through an oven N in which the varnish is dried. It then passes beneath a container O for the surfacing material, such for instance as heated asphaltic base material in which is incorporated a quantity of fine vermiculite. This surfacing material is discharged through a nozzle P to deposit a coating on the advancing strip and after cooling, forms a weatherproof coating.

In place of applying this material to a continuous fabric strip it may, if desired, be mounted upon a metal backing to form a shingle. This is illustrated in Figure 2 in which Q is the metal backing plate, R the porous vermiculite and S the outer facing of weatherproofing material. In place of the asphaltic base, the surface coating may be of a varnish binder having the vermiculite dust incorporated therein, but such material would require a longer time for drying.

What I claim as my invention is:

A roof covering comprising a metallic base, a layer of exfoliated vermiculite and a varnish binder having a relatively high percentage of voids therein, and a superposed layer of waterproof material.

JAMES P. BURKE.